United States Patent
Bienerth et al.

(10) Patent No.: US 9,631,766 B2
(45) Date of Patent: Apr. 25, 2017

(54) USE OF INORGANIC MATERIALS FOR PRODUCING COMPOSITES

(71) Applicant: Wacker Chemie AG, Munich (DE)

(72) Inventors: Holger Bienerth, München (DE); Klaus-Jürgen Eder, Mitterskirchen (DE); Karl Weber, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 130 days.

(21) Appl. No.: 14/384,936

(22) PCT Filed: Mar. 11, 2013

(86) PCT No.: PCT/EP2013/054906
§ 371 (c)(1),
(2) Date: Nov. 24, 2014

(87) PCT Pub. No.: WO2013/135641
PCT Pub. Date: Sep. 19, 2013

(65) Prior Publication Data
US 2015/0069283 A1  Mar. 12, 2015

(30) Foreign Application Priority Data

Mar. 13, 2012  (DE) .................. 10 2012 203 881

(51) Int. Cl.
| | | |
|---|---|---|
| F16L 59/02 | (2006.01) | |
| G10K 11/165 | (2006.01) | |
| B29C 45/00 | (2006.01) | |
| B29C 43/00 | (2006.01) | |
| B29C 47/00 | (2006.01) | |
| B29C 43/24 | (2006.01) | |
| B29D 99/00 | (2010.01) | |
| C04B 26/04 | (2006.01) | |
| C04B 26/06 | (2006.01) | |
| C04B 26/08 | (2006.01) | |
| C08K 11/00 | (2006.01) | |
| B29K 23/00 | (2006.01) | |
| B29K 27/00 | (2006.01) | |
| B29K 31/00 | (2006.01) | |
| B29K 509/00 | (2006.01) | |
| C04B 103/00 | (2006.01) | |

(52) U.S. Cl.
CPC .......... *F16L 59/028* (2013.01); *B29C 43/003* (2013.01); *B29C 43/24* (2013.01); *B29C 45/0001* (2013.01); *B29C 47/0011* (2013.01); *B29D 99/001* (2013.01); *C04B 26/04* (2013.01); *C04B 26/045* (2013.01); *C04B 26/06* (2013.01); *C04B 26/08* (2013.01); *C08K 11/00* (2013.01); *G10K 11/165* (2013.01); *B29K 2023/00* (2013.01); *B29K 2027/00* (2013.01); *B29K 2031/00* (2013.01); *B29K 2509/00* (2013.01); *C04B 2103/0057* (2013.01); *Y02W 30/91* (2015.05); *Y02W 30/92* (2015.05); *Y02W 30/93* (2015.05); *Y02W 30/94* (2015.05); *Y02W 30/95* (2015.05); *Y02W 30/96* (2015.05); *Y02W 30/97* (2015.05)

(58) Field of Classification Search
CPC . F16L 59/028; G10K 11/165; B29C 45/0001; B29C 43/003; B29C 47/0011; B29C 43/24; B29D 99/001
USPC ........ 524/401; 252/62; 264/328.1, 319, 148, 264/175
See application file for complete search history.

(56) References Cited

U.S. PATENT DOCUMENTS

| | | | |
|---|---|---|---|
| 3,836,504 A * | 9/1974 | Morisawa | ............... C04B 26/04 523/220 |
| 2007/0157854 A1 | 7/2007 | Roberts et al. | |
| 2008/0115442 A1 | 5/2008 | Cheng | |
| 2009/0004459 A1 | 1/2009 | Kipp et al. | |
| 2011/0207858 A1 | 8/2011 | Pfaadt | |
| 2012/0071588 A1* | 3/2012 | Ingrisch | .................. C04B 26/02 524/5 |

(Continued)

FOREIGN PATENT DOCUMENTS

| | | |
|---|---|---|
| AU | 197018580 | 2/1972 |
| CH | 430 557 A | 2/1967 |
| CN | 101 428 986 A | 5/2009 |

(Continued)

OTHER PUBLICATIONS

You Dajin et al., "Practical Technique for Pre-mixed Mortar", Beijing: Cheical Industry Press, Jan. 31, 2011, p. 51.

(Continued)

*Primary Examiner* — Bijan Ahvazi
*Assistant Examiner* — Ronald Grinsted
(74) *Attorney, Agent, or Firm* — RatnerPrestia

(57) ABSTRACT

A method of producing composites from inorganic materials by processing with thermoplastic forming techniques mixtures containing one or more inorganic, fine residual materials and one or more polymers based on ethylenically unsaturated monomers in the form of protective colloid-stabilized, water-redispersible polymer powders, wherein the inorganic, fine residual materials are based on inorganic materials selected from the group consisting of gypsum, lime, talc, silicas, kaolins, silicates and titanium dioxide, and wherein the composites are based on from 5 to 80% by weight of polymers based on ethylenically unsaturated monomers and from 20 to 95% by weight of inorganic, fine residual materials, based on the total weight of polymer based on ethylenically unsaturated monomers and inorganic, fine residual materials.

8 Claims, No Drawings

(56) References Cited

U.S. PATENT DOCUMENTS

2012/0245255 A1    9/2012  Zhang et al.

FOREIGN PATENT DOCUMENTS

| CN | 102180925 | | 9/2011 | | |
|---|---|---|---|---|---|
| DE | 2042176 | | 4/1971 | | |
| DE | 10 2009 003 196 | A1 | 11/2010 | | |
| DE | 102009003196 | A1 * | 11/2010 | ........... | C04B 24/383 |
| DE | 10 2009 046 810 | A1 | 5/2011 | | |
| EP | 2 397 516 | A1 | 12/2011 | | |
| GB | 1002010 | A | 8/1965 | | |
| JP | 9-124353 | A | 5/1997 | | |
| WO | 2004/071987 | A1 | 8/2004 | | |
| WO | 2010/133560 | A1 | 11/2010 | | |

OTHER PUBLICATIONS

English patent abstract for CN 101 428 986 A (attached to reference).
English patent abstract for JP 9-124353 A (attached to reference).
English patent abstract for DE 10 2009 046 810 A1 (attached to reference).
Fox T. G., Bull. Am. Physics Soc. 1, 3, p. 123 (1956).
Polymer Handbook 2nd Edition, J. Wiley & Sons, New York (1975).
Schulze J. in TIZ, vol. 109, No. 9, 1985.
English patent abstract for Schulze, vol. 109, No. 9, 1985 (attached to reference).
International Search Report for PCT/EP2013/054906 mailed Jul. 7, 2013.

\* cited by examiner

USE OF INORGANIC MATERIALS FOR PRODUCING COMPOSITES

CROSS REFERENCE TO RELATED APPLICATIONS

This application is a U.S. national stage application of PCT International Application No. PCT/EP2013/054906, filed Mar. 11, 2013, claiming benefit under 35 U.S.C. §§120 and 365(a) and under 35 U.S.C. §119 of German Application No. DE 10 2012 203881.7, filed Mar. 13, 2012, each of which are incorporated by reference herein in their entirety.

BACKGROUND

The invention relates to the use of inorganic materials for producing composites, in particular for producing insulating or damping materials in board form.

Composites based on inorganic materials are widely known. Thus, US2009/0004459 describes wall construction boards based on silicates and vinyl acetate polymers. US 2008/0115442 discloses sandwich-like composites composed of gypsum plaster layers or concrete layers, polystyrene panels and glass fiber meshes.

In the processing of inorganic materials, tremendous amounts of fine waste, for example gypsum plaster, concrete or silicate grinding dusts, are formed every year; these have hitherto mostly not had any uses and have to be disposed of in a costly manner. There is therefore a need for approaches by means of which such waste materials can be processed to give products of value. This is desirable for economic reasons because of increasing raw materials costs and also because products of value can be obtained instead of the expensive disposal of waste materials. More efficient management of raw materials and, associated therewith, usually also a lower energy consumption is also urgently required for ecological reasons.

SUMMARY

In view of this background, it is an object of the invention to develop new approaches by means of which composites based on inorganic materials can be obtained in a manner which saves material and if possible energy.

This object has surprisingly been achieved by the fine residues such as grinding dusts or sawdusts of, for example, limestone arising in various processes for working inorganic materials being processed by means of thermoplastic processing methods using polymers based on ethylenically unsaturated monomers to give composites.

The invention provides for the use of inorganic materials for producing composites, characterized in that mixtures containing one or more inorganic, fine residual materials and one or more polymers based on ethylenically unsaturated monomers are processed by means of thermoplastic forming techniques.

DETAILED DESCRIPTION

The inorganic, fine residual materials are based, for example, on inorganic materials such as oxides, hydroxides, carbonates, silicates, sulfates or sulfides of metals or semimetals. Suitable metals or semimetals are, for example, alkali metals such as lithium, sodium or potassium; alkaline earth metals such as magnesium, calcium, barium; or atoms of the third main group, e.g. aluminum or boron; but also transition metals such as titanium. Preferred metals or semimetals are magnesium, calcium, barium or aluminum. Preferred inorganic, fine residual materials are based on gypsum, lime, in particular calcium or magnesium carbonate, talc, silicas, kaolins, silicates or titanium dioxide; particularly preferably on gypsum, lime or chalk and most preferably on limestone or gypsum.

The inorganic, fine residual materials can be present in any forms, for example in the form of turnings, or in particular in the form of dust, flour or fibers.

The inorganic, fine residual materials preferably have particle sizes of from 0.1 µm to 2000 µm, particularly preferably from 0.2 µm to 1000 µm, even more preferably from 0.2 µm to 500 µm and most preferably from 0.2 µm to 250 µm (determination by means of random light scattering using the instrument TGV Coulter LS 13320). Preference is given to from 0.1 to 100% by volume, more preferably from 80 to 100% by volume and in particular from 90 to 100% by volume, of the inorganic, fine residual materials having particle sizes of from 0.5 to 2000 µm, particularly preferably from 0.5 to 500 µm and most preferably from 0.5 to 100 µm (determination by means of random light scattering using the instrument TGV Coulter LS 13320). A maximum, in particular the largest maximum, of the particle size distribution of the inorganic, fine residual materials is preferably in the range from 0.5 to 200 µm and particularly preferably in the range from 5 to 100 µm (determination by means of random light scattering using the instrument TGV Coulter LS 13320). If the inorganic, fine residual materials are not essentially round or spherical, the figures indicated in respect of the particle sizes preferably relate to the dimension of the fine residual materials having the smallest extension.

Fibers or turnings preferably have a length of from 0.1 mm to 5 mm and particularly preferably from 0.5 mm to 2 mm. However, the inorganic, fine residual materials are usually essentially round or spherical.

The inorganic, fine residual materials are obtained, for example, during grinding, comminution, machine milling, sawing, drilling, peeling or cutting of inorganic materials. The inorganic, fine residual materials can also be particles formed by abrasion of such materials. Inorganic, fine residual materials are obtained, for example, in the building industry, in furniture production, in stonemasonry or generally in the processing of inorganic materials. Such inorganic, fine residual materials are formed to a particular extent in dry construction or in production of floor coverings, in particular in the production of hollow floors or gypsum plasterboards. The inorganic, fine residual materials can be obtained in the desired form in the abovementioned processes or can be brought to the desired form by means of further processing, for example by means of comminution, crushing, squeezing or precipitation.

Suitable polymers based on ethylenically unsaturated monomers are, for example, those based on one or more monomers from the group consisting of vinyl esters, (meth)acrylic esters, vinylaromatics, olefins, 1,3-dienes and vinyl halides and optionally further monomers which can be copolymerized therewith.

Suitable vinyl esters are, for example, those of carboxylic acids having from 1 to 22 carbon atoms, in particular from 1 to 12 carbon atoms. Preference is given to vinyl acetate, vinyl propionate, vinyl butyrate, vinyl 2-ethylhexanoate, vinyl laurate, vinyl myristate, vinyl palmitate, vinyl stearate, vinyl arachinate, 1-methylvinyl acetate, vinyl pivalate and vinyl esters of α-branched monocarboxylic acids having from 9 to 11 carbon atoms, for example VeoVa9® or VeoVa10® (trade names of Resolution). Vinyl acetate is particularly preferred.

Suitable acrylic esters or methacrylic esters are, for example, esters of unbranched or branched alcohols having from 1 to 22 carbon atoms, in particular from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, lauryl acrylate, myristyl acrylate, stearyl acrylate, palmityl acrylate, lauryl methacrylate, myristyl methacrylate, stearyl methacrylate or palmityl methacrylate. Particular preference is given to methyl acrylate, methyl methacrylate, n-butyl acrylate, t-butyl acrylate or 2-ethylhexyl acrylate.

Preferred vinylaromatics are styrene, methylstyrene and vinyltoluene. A preferred vinyl halide is vinyl chloride. The preferred olefins are ethylene, propylene and the preferred dienes are 1,3-butadiene and isoprene.

From 0.1 to 10% by weight, based on the total weight of the monomer mixture, of auxiliary monomers can optionally be copolymerized. Preference is given to using from 0.5 to 5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or salts thereof, preferably vinylsulfonic acid, 2-acrylamido-2-methylpropanesulfonic acid. Further examples are precrosslinking comonomers such as multiply ethylenically unsaturated comonomers, for example diallyl phthalate, divinyl adipate, diallyl maleate, allyl methacrylate or triallyl cyanurate, or postcrosslinking comonomers, for example acrylamidoglycolic acid (AGA), methyl methacrylamidoglycolate (MAGME), N-methylolacrylamide (NMA), N-methylolmethacrylamide, N-methylolallyl carbamate, alkyl ether such as the isobutoxy ether or ester of N-methylolacrylamide, of N-methylol-methacrylamide and of N-methylolallyl carbamate. Epoxide-functional comonomers such as glycidyl methacrylate and glycidyl acrylate are also suitable. Further examples are silicon-functional comonomers, such as acryloxypropyltri(alkoxy)silanes and methacryloxypropyltri(alkoxy)silanes, vinyltrialkoxysilanes and vinylmethyldialkoxysilanes, with, for example, ethoxy radicals and ethoxypropylene glycol ether radicals being able to be present as alkoxy groups. Mention may also be made of monomers having hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide or acetylacetoxyethyl acrylate or methacrylate.

The monomer selection or the selection of the proportions by weight of the comonomers is carried out in such a way that, in general, a glass transition temperature Tg of ≤+120° C., preferably from −50° C. to +60° C., even more preferably from −30° C. to +40° C. and most preferably from −15° C. to +20° C., results. The glass transition temperature Tg of the polymers can be determined in a known way by means of differential scanning calorimetry (DSC). The Tg can also be calculated approximately beforehand by means of the Fox equation. According to Fox T. G., Bull. Am. Physics Soc. 1, 3, page 123 (1956): $1/Tg=x_1/Tg_1+x_2/Tg_2+ \ldots +x_n/Tg_n$, where $x_n$ is the mass fraction (% by weight/100) of the monomer n and $Tg_n$ is the glass transition temperature in kelvin of the homopolymer of the monomer n. Tg values for homopolymers are given in Polymer Handbook 2nd Edition, J. Wiley & Sons, New York (1975).

Preference is given to homopolymers or copolymers containing one or more monomers from the group consisting of vinyl acetate, vinyl esters of α-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene. Particular preference is given to copolymers comprising vinyl acetate and ethylene; comprising vinyl acetate, ethylene and a vinyl ester of α-branched monocarboxylic acids having from 9 to 11 carbon atoms; comprising n-butyl acrylate and 2-ethylhexyl acrylate and/or methyl methacrylate; comprising styrene and one or more monomers from the group consisting of methyl acrylate, ethyl acrylate, propyl acrylate, n-butyl acrylate, 2-ethylhexyl acrylate; comprising vinyl acetate and one or more monomers from the group consisting of methyl acrylate, ethyl acrylate, propyl acrylate, n-butyl acrylate, 2-ethylhexyl acrylate and optionally ethylene; comprising 1,3-butadiene and styrene and/or methyl methacrylate and also optionally further acrylic esters; with the mixtures mentioned optionally also being able to contain one or more of the above-mentioned auxiliary monomers.

The preparation of the polymers is carried out in a known way, for example by the emulsion polymerization process or by the suspension polymerization process in the presence of emulsifiers or preferably of protective colloids, preferably by the emulsion polymerization process, with the polymerization temperature generally being from 20° C. to 100° C., preferably from 60° C. to 90° C., and the copolymerization of gaseous comonomers such as ethylene preferably being able to be carried out under superatmospheric pressure, in general in the range from 5 bar to 100 bar. Initiation of the polymerization is effected using the water-soluble or monomer-soluble initiators or redox initiator combinations customary for emulsion polymerization or suspension polymerization. To control the molecular weight, regulating substances can be used during the polymerization. Protective colloids, optionally in combination with emulsifiers, can be used to effect stabilization. The polymers are preferably present in the form of protective colloid-stabilized, aqueous dispersions.

Protective colloids customary for stabilizing the polymerization batch are, for example, partially hydrolyzed or fully hydrolyzed polyvinyl alcohols; polyvinylpyrrolidones; polyvinyl acetals; polysaccharides in water-soluble form, e.g. starches (amylose and amylopectin), celluloses and carboxymethyl, methyl, hydroxyethyl, hydroxypropyl derivatives thereof; proteins such as casein or caseinate, soybean protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine-formaldehydesulfonates, naphthalene-formaldehydesulfonates, styrene-maleic acid and vinyl ether-maleic acid copolymers. Preference is given to partially hydrolyzed or fully hydrolyzed polyvinyl alcohols. Particular preference is given to partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015).

Suitable emulsifiers are, for example, anionic, cationic or nonionic emulsifiers, e.g. anionic surfactants such as alkyl sulfates having a chain length of from 8 to 18 carbon atoms, alkyl ether sulfates or alkyl aryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkyl aryl polyglycol ethers having from 8 to 40 ethylene oxide units. In general, from 1 to 5% by weight of emulsifiers, based on the total weight of the monomers, are used. The polymerization is preferably carried out without addition of emulsifiers.

The aqueous dispersions which can be obtained in this way have a solids content of preferably from 30 to 75% by weight, particularly preferably from 50 to 60% by weight.

To convert the polymers into water-redispersible polymer powders, the dispersions can, optionally after addition of further protective colloids as drying aids, be dried, for example by means of fluidized-bed drying, freeze drying or spray drying. The dispersions are preferably spray dried. Spray drying can be carried out in conventional spray drying plants, with atomization being able to be effected by means of single-fluid, two-fluid or multifluid nozzles or by means of a rotating disk. The exit temperature is generally selected in the range from 45° C. to 120° C., preferably from 60° C. to 90° C., depending on the plant, Tg of the resin and desired degree of drying. The viscosity of the feed to be atomized is set via the solids content so as to obtain a value of <500 mPas (Brookfield viscosity at 20 rpm and 23° C.), preferably <250 mPas. The solids content of the dispersion to be atomized is >35%, preferably >40%.

In general, the drying aid is used in a total amount of from 0.5 to 30% by weight, based on the polymeric constituents of the dispersion. This means that the total amount of protective colloid before the drying operation should preferably be from at least 1 to 30% by weight, based on the proportion of polymer; particular preference is given to using a total of from 5 to 20% by weight of protective colloid, based on the polymer constituents of the dispersion. Suitable drying aids are, for example, the abovementioned protective colloids.

A content of up to 1.5% by weight of antifoam, based on the base polymer, has frequently been found to be advantageous for atomization. To increase the shelf life by improving the blocking stability, in particular in the case of powders having a low glass transition temperature, the powder obtained can be provided with an antiblocking agent (anticaking agent), preferably from 1 to 30% by weight, based on the total weight of polymeric constituents. Examples of any blocking agents are Ca or Mg carbonate, talc, gypsum, silica, kaolins such as metakaolin, silicates having particle sizes which are preferably in the range from 10 nm to 10 μm.

Redispersion powders containing copolymers comprising vinyl acetate and ethylene or copolymers comprising vinyl acetate, ethylene and a vinyl ester of α-branched monocarboxylic acids having from 9 to 11 carbon atoms as base polymer and partially hydrolyzed polyvinyl alcohol as protective colloid are most preferred.

The term water-redispersible polymer powder or redispersion powder refers to polymer compositions which are made available by means of drying of the corresponding aqueous dispersions of polymers in the presence of drying aids, in particular protective colloids. Due to this production process, the finely divided resin of the dispersion is enveloped in a sufficient amount of a drying aid or a protective colloid. During drying, the drying aid or the protective colloid acts like a jacket which prevents conglutination of the particles. On redispersion in water, the drying aid or the protective colloid dissolves in water again and an aqueous dispersion of the original polymer particles is obtained (Schulze J. in TIZ, No. 9, 1985).

The polymers are preferably used in the form of aqueous dispersions or particularly preferably in the form of water-redispersible polymer powders.

The composites are based on preferably from 5 to 80% by weight, particularly preferably from 10 to 50% by weight and most preferably from 20 to 40% by weight, of polymers; from 20 to 95% by weight, particularly preferably from 50 to 90% by weight and most preferably from 60 to 80% by weight, of inorganic, fine residual materials, in each case based on the total weight of polymer and inorganic, fine residual materials.

Furthermore, the composites can contain one or more organic fillers, based, for example, on wood, leather, coconut material such as coconut fibers, or other natural fibers or in particular cork. The organic fillers are generally present in particulate, in particular finely divided, form. Cork equips the composites with particularly advantageous insulating properties; Leather produces composites which contain organic material and have an advantageous burning behavior.

Apart from the inorganic, fine residual materials, the composites can contain one or more further inorganic fillers. The further inorganic fillers are not residual materials and not waste materials, but instead are inorganic materials provided specifically as fillers. The further inorganic fillers can also be based on the inorganic materials mentioned above in the description of the inorganic, fine residual materials.

The further inorganic fillers are generally distinguished from the residual materials according to the invention by a more uniform particle size distribution. Thus, the volume distribution curve of the further fillers preferably has ≤2 maxima and in particularly only one maximum. The volume distribution curve of the inorganic, fine residual materials preferably has ≥3 maxima and particularly preferably ≥4 maxima. The volume distribution curve depicts the distribution of the total volume of the particles as a function of the particle diameters of the particles.

In the case of the inorganic, fine residual materials, the ratio of the two largest maxima of the volume distribution curve is preferably from 1 to 2.4, particularly preferably from 1 to 2 and most preferably from 1 to 1.5. In the further inorganic fillers, the ratio of the two largest maxima of the volume distribution curve is, if two maxima are present, preferably ≥2.5, particularly preferably ≥3 and most preferably ≥3.5.

The joint use of further inorganic fillers or organic fillers in the form of fibers is preferred.

The organic fillers and/or the further inorganic fillers can, for example, be used in an amount of from 0 to 90% by weight, preferably from 10 to 90% by weight, particularly preferably from 10 to 60% by weight and most preferably from 15 to 40% by weight, based on the total weight of polymer and inorganic, fine residual materials.

Additives such as lubricants, for example calcium stearate, plasticizers, antioxidants, UV stabilizers, antistatics, bonding agents, antiblocking agents, dyes, pigments, fillers, processing aids or peroxides such as peroxodicarbonate for postcrosslinking can optionally also be used in the production of the composites. Preference is given here to lubricants. Furthermore, conventional thermoplastics, elastomers or thermosets can also be added in addition to the polymers used according to the invention. Additives can be used in the customary amounts, for example from 0 to 2% by weight, in particular from 0 to 1% by weight and preferably from 0.5 to 1% by weight, based on the total weight of polymer and inorganic, fine residual materials.

The individual constituents of the composites are mixed and subsequently processed by means of conventional thermoplastic forming techniques to give composites.

Mixing can, for example, be carried out in a heating-cooling mixer but also by means of direct pelletization for example in an extruder, palltruder or agglomerator. Mixing is preferably carried out in a multiscrew extruder, planetary gear extruder, particularly preferably a twin screw extruder, in particular a contrarotating twin screw extruder.

Suitable thermoplastic forming techniques are, for example, extrusion, injection molding, pressing, pelletization and calendering. Preference is given to pelletization and in particular pressing.

Preference is given to firstly producing granules, pellets or compounds by means of thermoplastic forming techniques and subsequently processing these further by means of further thermoplastic forming techniques. The granules, pellets or compounds have particle sizes of preferably from 2 to 6 mm.

The processing temperature during mixing is generally from 40° C. to 120° C., preferably from 60° C. to 100° C. During thermoplastic processing, the processing temperature is generally from 80° C. to 220° C., preferably from 120° C. to 180° C. The temperature ranges mentioned are particularly advantageous so that the polymers, in particular the polymers in the form of water-redispersible polymer powders, and the further components for producing the composites are intimately mixed and the polymers display their binder effect. At higher temperatures, constituents of the composites can suffer damage.

The mode of operation according to the invention is suitable for producing a wide variety of moldings, boards, sheet-like structures or of rolled-up goods. Examples are for this purpose thermal or acoustic insulating or damping materials, in particular in board form. Further examples are use in the shoe, clothing, furniture, sports, leisure industry or in particular in the building industry, for example for producing wall, floor or ceiling coverings. Preference is given to insulation materials, in particular wall or floor coverings. The composites can serve as rear side coatings of floor coverings such as carpets or ceiling systems. Here, the composites can replace the frowned-on bitumen. The use of the composites according to the invention advantageously leads to damping of sound in the room and in addition footfall sound and also to thermal insulation.

The composites produced according to the invention are characterized by high mechanical strengths, even at very high proportions of inorganic materials or other fillers, and even though fine or even dust-like starting materials can be used for producing the composites. It was also surprising that inorganic, fine residual materials could be processed very readily despite nonuniform particle size distributions in the use according to the invention and, in addition, lead to composites having a regular appearance and homogeneous use properties. The mechanical strength can be increased further by use of redispersible polymer powders. When polymer powders having a glass transition temperature Tg of the base polymer according to the invention are used, moldings which have both a high mechanical strength and a high elasticity are obtained. The use of ethylene-containing polymers enables the elasticity of the composites to be increased further. The composites have the natural properties, e.g. odor, feel or optics, of the inorganic materials or the organic fillers such as cork. For this, the small proportions of polymer, in particular, are advantageous.

It is particularly advantageous that fine inorganic waste can be utilized in a value-adding manner and costly inorganic or organic fillers can be replaced.

The following examples serve to illustrate the invention:
The following materials were used for testing:
Vinnex A: redispersible polymer powder from Wacker Chemie: polyvinyl alcohol-stabilized polymer powder based on a vinyl acetate-ethylene copolymer having a Tg of −7° C.
Vinnex B: redispersible polymer powder from Wacker Chemie: polyvinyl alcohol-stabilized polymer powder based on a vinyl acetate-ethylene copolymer having a Tg of −14° C.
Gypsum grinding dust:
particle size from 0.2 μm to 250 μm (determined by the method of random light scattering by means of TGV Coulter LS 13320); maximum of the particle size distribution at 15 μm (determined by the method of random light scattering by means of TGV Coulter LS 13320).

Cork particles from Amorim having a particle size of from 1 to 2 mm.

The materials mentioned were homogeneously mixed in the ratios indicated in the table in a heating-cooling mixer to a final mixing temperature of 80° C. and subsequently cooled to 40° C. The mixture was then processed on a contrarotating twin screw extruder Weber DS 48 to give pellets having a diameter of from 2 to 6 mm.

The pellets were processed on a static press at a temperature of 150° C. and a pressure of 5 N/mm$^2$ and a pressing time of 5 minutes to give pressed boards having a thickness of 2 mm or 6 mm.

The Shore hardness A and also the Shore hardness D of the pressed boards was determined in accordance with DIN 53505.

The mechanical strength of the pressed boards was determined in a tensile test by determination of the tensile stress and elongation at break in accordance with DIN EN ISO 527 1-3 or DIN 53504.

The results are summarized in the table.

TABLE

| Formulation | Ex. 1 | Ex. 2 | Ex. 3 |
|---|---|---|---|
| Gypsum grinding dust [kg] | 70 | 5 | 70 |
| Vinnex A [kg] | 30 | 30 | |
| Vinnex B [kg] | | | 30 |
| Cork particles [kg] | | 15 | |
| Shore A | 85.1 | 89.8 | 80.7 |
| Shore D | 25.4 | 33.8 | 19.8 |
| Tensile stress [MPa] | 6.67 | 5.45 | 3.23 |
| Elongation [%] | 17.12 | 23.1 | 71.35 |

The invention claimed is:
1. A method of producing composites from inorganic materials, comprising the steps of processing by thermoplastic forming techniques mixtures containing one or more inorganic, fine residual materials and one or more polymers based on ethylenically unsaturated monomers in the form of protective colloid-stabilized, water-redispersible polymer powders, wherein the inorganic, fine residual materials are based on inorganic materials selected from the group con- sisting of gypsum, lime, talc, silicas, kaolins, silicates and titanium dioxide, and wherein the composites are based on from 5 to 80% by weight of polymers based on ethylenically unsaturated monomers and from 20 to 95% by weight of inorganic, fine residual materials, based on the total weight of polymer based on ethylenically unsaturated monomers and inorganic, fine residual materials.

2. The method of claim 1, wherein the inorganic, fine residual materials are further based on inorganic materials selected from the group consisting of oxides, hydroxides, carbonates, silicates, sulfates and sulfides of metals or semimetals.

3. The method of claim 1, wherein the inorganic, fine residual materials are obtained during grinding, comminution, machine milling, sawing, drilling, peeling or cutting or as abrasion from inorganic materials.

4. The method of claim 1, wherein the polymers are based on one or more ethylenically unsaturated monomers selected from the group consisting of vinyl esters, (meth)acrylic esters, vinylaromatics, olefins, 1,3-dienes and vinyl halides.

5. The method of claim 1, wherein one or more organic fillers and/or one or more further inorganic fillers which are different from the inorganic fine residual materials are used.

6. The method of claim 1, wherein the mixtures are processed by means of thermoplastic forming techniques selected from the group consisting of extrusion, injection molding, pressing, pelletization and calendering.

7. The method of claim 1, wherein the composites comprise moldings, boards, sheet-like structures or rolled-up goods.

8. The method of claim 1, wherein the composites comprise thermal or acoustic insulating or damping materials.

* * * * *